United States Patent
Carty et al.

(10) Patent No.: US 10,812,321 B2
(45) Date of Patent: Oct. 20, 2020

(54) PREDICTIVE NETWORK NODE ALLOCATION

(71) Applicant: Avaya Inc., Santa Clara, CA (US)

(72) Inventors: Gerard Carty, Galway (IE); Thomas Moran, Galway (IE)

(73) Assignee: Avaya Inc., Santa Clara, CA (US)

( * ) Notice: Subject to any disclaimer, the term of this patent is extended or adjusted under 35 U.S.C. 154(b) by 46 days.

(21) Appl. No.: 16/188,610

(22) Filed: Nov. 13, 2018

(65) Prior Publication Data

US 2020/0153681 A1     May 14, 2020

(51) Int. Cl.
*H04L 12/24*     (2006.01)
*H04M 3/51*      (2006.01)
*G06F 1/16*      (2006.01)

(52) U.S. Cl.
CPC ...... *H04L 41/0672* (2013.01); *H04L 41/0663* (2013.01); *H04L 41/0668* (2013.01); *H04L 41/147* (2013.01); *H04L 41/22* (2013.01); *H04M 3/5175* (2013.01); *G06F 1/163* (2013.01)

(58) Field of Classification Search
CPC ............. H04L 41/0672; H04L 41/0663; H04L 41/0668; H04L 41/147; H04L 41/22; H04M 3/5175
See application file for complete search history.

(56) References Cited

U.S. PATENT DOCUMENTS

| | | | |
|---|---|---|---|
| 8,634,543 B2 | 1/2014 | Flockhart et al. | |
| 8,715,179 B2 | 5/2014 | Price et al. | |
| 9,674,642 B2 * | 6/2017 | Singh | H04W 4/38 |
| 10,289,464 B1 * | 5/2019 | DeLozier | G06F 11/3072 |
| 2008/0317063 A1 * | 12/2008 | Enzmann | H04L 12/2803 |
| | | | 370/466 |
| 2010/0235218 A1 | 9/2010 | Erhart et al. | |
| 2010/0296417 A1 | 11/2010 | Steiner | |
| 2011/0125793 A1 | 5/2011 | Erhart et al. | |
| 2011/0125826 A1 | 5/2011 | Erhart et al. | |
| 2016/0286047 A1 | 9/2016 | Valentine et al. | |
| 2018/0107936 A1 | 4/2018 | Chattopadhyay et al. | |
| 2019/0000402 A1 * | 1/2019 | Tang | A61B 7/04 |

OTHER PUBLICATIONS

Kastrenakes "GPS will be accurate within one foot in some phones next year," The Verge, Sep. 25, 2017, 2 pages [retrieved online from: www.theverge.com/circuitbreaker/2017/9/25/16362296/gps-accuracy-improving-one-foot-broadcom Smartphones].

* cited by examiner

*Primary Examiner* — Rasheed Gidado
(74) *Attorney, Agent, or Firm* — Sheridan Ross P.C.

(57) ABSTRACT

A plurality of nodes on a network may be utilized to communicate with external nodes outside of the plurality. The removal from service of a number of the plurality of nodes may cause the network to become ineffective or inoperable. Nodes may be monitored to determine a predicated out-of-service condition and mitigating actions taken. For example, if an operator of a node is likely to be unable to provide required inputs to the node, another node with associated operator may be allocated to become available at a timely predicted to coincide with the outage of the monitored node. Other mitigating actions may also be utilized, such as reassigning the physical location of the monitored node.

20 Claims, 5 Drawing Sheets

PREDICTIVE NETWORK NODE ALLOCATION

COPYRIGHT NOTICE

A portion of the disclosure of this patent document contains material that is subject to copyright protection. The copyright owner has not objected to the facsimile reproduction by anyone of the patent document or the patent disclosure as it appears in the Patent and Trademark Office patent files or records, but otherwise reserves all copyright rights whatsoever.

FIELD OF THE DISCLOSURE

The invention relates generally to systems and methods for maintaining a communication network and particularly to predictively allocating nodes on the network.

BACKGROUND

Communication networks comprise a number of communication nodes. The nodes may be segregated as internal nodes, as part of one sub-network of nodes, and external nodes. One example is a contact center wherein an external node is connected to an internal node selected by a component of the sub-network.

Network nodes may be inoperable for various reasons, such as being powered-down, being serviced, or unattended. If the number network nodes, especially internal network nodes, that have become inoperable is excessive, the sub-network may over tax remaining nodes and become unable to meet the demands for which it operates, resulting in impaired, dropped, or unconnected communications with other nodes, such as with external nodes.

SUMMARY

These and other needs are addressed by the various embodiments and configurations of the present invention. The present invention can provide a number of advantages depending on the particular configuration. These and other advantages will be apparent from the disclosure of the invention(s) contained herein.

In one embodiment, data is utilized that predicts operators' future wellbeing to adjust forecasts and schedules in a Workforce Management system for contact centers. Prior art management of absenteeism due to illness, include over-staffing, calling in staff at the last minute or moving staff from less critical tasks, etc., in order to ensure sufficient network nodes remain operational.

The prior art may monitor personnel and detect performance characteristics such as sweatiness of the palms, heart rate, body temperature, body motion, eye movement or facial expression, or speech patterns indicating known conditions and provide feedback. This feedback can be used by a call center quality management tool to alert an intervention to resolve issues, such as a likely node being unattended due to an operator, such as an operator, being ill.

Many sporting teams use devices to track athletes dynamic stress load, a measure that takes into account their running motion, speed, distance run, heart rate, etc. These are used to establish an athlete's stress load. When an athlete exceeds their limit they are sidelined to prevent injury.

In a contact center, an operator wears some wearable technology (e.g. wristband) or their workstation is equipped with a device (e.g. pc camera, mouse, keyboard) that can monitor and measure performance characteristics which may include sweatiness of the palms, heart rate, body temperature, body motion, eye movement or facial expression. These are used to baseline a standard metric for each operator. Pre-defined variances from these levels are an indication of a potential illness that the operator is about to suffer. When an operator exceeds pre-defined variances from these levels, information is sent to the WFM forecasting and scheduling engine to potentially remove this operator from the schedule for the number of days the illness is expected to run and to also reschedule other resources to cover for this absence. One advantage is that the WFM system detects a potential operator absence due to illness even before the operators themselves are aware (in many cases, operators wait until their symptoms progress to a more advanced state before they call in sick, often providing insufficient notice in which resources could otherwise be reallocated).

In another embodiment, the forecasting and scheduling engine uses a statistical model of the operators' data to calculate the likelihood of operator absenteeism and may place alternative staff on alert for a potential future call into work.

In another embodiment, such as may be deployed in a large contact center, if there are a number of operators who all exhibit a risk of being absent due to illness, then the WFM forecasting and scheduling engine may use a combined approach of both explicitly adding extra resources and also sending alerts to additional resources, based on the operators involved and their skillsets. This not only helps to improve the accuracy of the contact center staffing, but also helps to alleviate the dissatisfaction that an operator experiences when called into work without any advance warning.

In a further embodiment, an operator observed to be exhibiting higher than normal stress levels may be scheduled for extra time off, assigned to a more isolated work area, assigned to work that is known to be less stressful or, in the case of impending illness, be encouraged to work from home to avoid spreading possible illness. Using an operators' current biometrics data scored against known baselines and building in a stress score to work queues/routing attribute services the forecasting and scheduling engine can manage an operators schedule to avoid illness in the first place and therefore reduce disruption and costs.

Once a biometric anomaly is detected, the operator's location history may be analyzed, and determination made as to what other employees they were in close proximity with. These other employees could also be flagged for time off or remote working.

In one embodiment, a system is disclosed, comprising: a plurality of nodes, wherein each of the plurality of nodes comprises a network interface to a communication network and an input-output interface to translate operator inputs into signals for transmission to an external node via the communication network as a portion of a communication therebetween; a router, comprising a microprocessor and a network interface to the communications network, operable to route the communication with the external node to a selected one of the plurality of communication nodes to enable the communication therebetween; and an operator monitor providing an operator condition signal to the router, wherein the operator is associated with a monitored node of the plurality of nodes; and wherein the router, upon determining the operation condition signal is associated with a predicted operator absence, performs a mitigation comprising allocating, for use at a future time, an additional node and associated operator and adding the additional node to the plurality of nodes.

In another embodiment, a method is disclosed, comprising: monitoring an operator of a monitored node, the monitored node being a node of a plurality of nodes, wherein each of the plurality of nodes comprises a network interface to a communication network and an input-output interface to translate operator inputs into signals for transmission to an external node via the communication network as a portion of a communication therebetween; determining, from the monitoring of the operator, an operator condition signal; providing the operator condition signal to a router configured to connect a selected one of the plurality of nodes to engage in a communication with an external node not comprised by the plurality of nodes; upon determining, by the router, that the operation condition signal is associated with a predicted operator absence and performing a mitigation comprising allocating, for use at a future time, an additional node and associated operator; and adding the additional node to the plurality of nodes.

In another embodiment, a computer-readable medium is disclosed comprising instructions that, when read by a microprocessor, cause the microprocessor to: monitor an operator of a monitored node, the monitored node being a node of a plurality of nodes, wherein each of the plurality of nodes comprises a network interface to a communication network and an input-output interface to translate operator inputs into signals for transmission to an external node via the communication network as a portion of a communication therebetween; determine, from the monitoring of the operator, an operator condition signal; providing the operator condition signal to a router configured to connect a selected one of the plurality of nodes to engage in a communication with an external node not comprised by the plurality of nodes; perform a mitigation comprising allocating, for use at a future time, an additional node and associated operator, upon determining, by the router, that the operation condition signal is associated with a predicted operator absence; and add the additional node to the plurality of nodes.

The phrases "at least one," "one or more," "or," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B, and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The preceding is a simplified summary of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below. Also, while the disclosure is presented in terms of exemplary embodiments, it should be appreciated that an individual aspect of the disclosure can be separately claimed.

BRIEF DESCRIPTION OF THE DRAWINGS

The present disclosure is described in conjunction with the appended figures.

DETAILED DESCRIPTION

The ensuing description provides embodiments only and is not intended to limit the scope, applicability, or configuration of the claims. Rather, the ensuing description will provide those skilled in the art with an enabling description for implementing the embodiments. It will be understood that various changes may be made in the function and arrangement of elements without departing from the spirit and scope of the appended claims.

Any reference in the description comprising an element number, without a subelement identifier when a subelement identifier exists in the figures, when used in the plural, is intended to reference any two or more elements with a like element number. When such a reference is made in the singular form, it is intended to reference one of the elements with the like element number without limitation to a specific one of the elements. Any explicit usage herein to the contrary or providing further qualification or identification shall take precedence.

The exemplary systems and methods of this disclosure will also be described in relation to analysis software, modules, and associated analysis hardware. However, to avoid unnecessarily obscuring the present disclosure, the following description omits well-known structures, components, and devices, which may be omitted from or shown in a simplified form in the figures or otherwise summarized.

For purposes of explanation, numerous details are set forth in order to provide a thorough understanding of the present disclosure. It should be appreciated, however, that the present disclosure may be practiced in a variety of ways beyond the specific details set forth herein.

Figure 1:
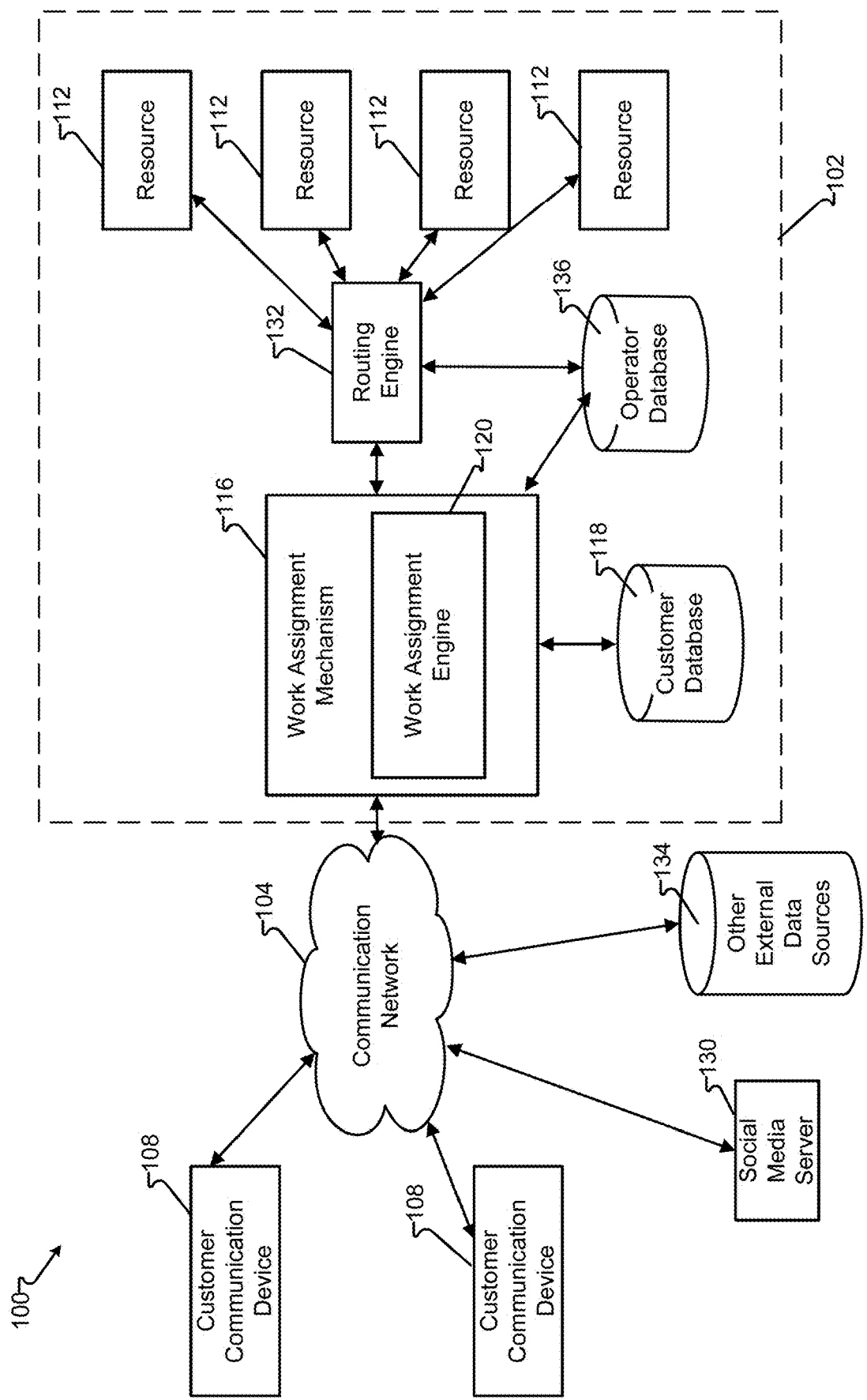
FIG. 1 depicts a first system in accordance with embodiments of the present disclosure.

With reference now to FIG. 1, communication system 100 is discussed in accordance with at least some embodiments of the present disclosure. The communication system 100 may be a distributed system and, in some embodiments, comprises a communication network 104 connecting one or more communication devices 108 to a work assignment mechanism 116, which may be owned and operated by an enterprise administering contact center 102 in which a plurality of resources 112 is distributed to handle incoming work items (in the form of contacts) from customer communication devices 108.

Contact center 102 is variously embodied to receive and/or send messages that are or are associated with work items and the processing and management (e.g., scheduling, assigning, routing, generating, accounting, receiving, monitoring, reviewing, etc.) of the work items by one or more resources 112. The work items are generally generated and/or received requests for a processing resource 112 embodied as, or a component of, an electronic and/or electromagnetically conveyed message. Contact center 102 may include more or fewer components than illustrated and/or provide more or fewer services than illustrated. The border indicating contact center 102 may be a physical boundary (e.g., a building, campus, etc.), legal boundary (e.g., company, enterprise, etc.), and/or logical boundary (e.g., resources 112 utilized to provide services to customers for a customer of contact center 102).

Furthermore, the border illustrating contact center 102 may be as-illustrated or, in other embodiments, include alterations and/or more and/or fewer components than illustrated. For example, in other embodiments, one or more of resources 112, customer database 118, and/or other component may connect to routing engine 132 via communication network 104, such as when such components connect via a public network (e.g., Internet). In another embodiment, communication network 104 may be a private utilization of, at least in part, a public network (e.g., VPN); a private network located, at least partially, within contact center 102; or a mixture of private and public networks that may be utilized to provide electronic communication of components described herein. Additionally, it should be appreciated that components illustrated as external, such as social media server 130 and/or other external data sources 134 may be within contact center 102 physically and/or logically, but still be considered external for other purposes. For example, contact center 102 may operate social media server 130 (e.g., a website operable to receive user messages from customers and/or resources 112) as one means to interact with customers via their customer communication device 108.

Customer communication devices 108 are embodied as external to contact center 102 as they are under the more direct control of their respective user or customer. However, embodiments may be provided whereby one or more customer communication devices 108 are physically and/or logically located within contact center 102 and are still considered external to contact center 102, such as when a customer utilizes customer communication device 108 at a kiosk and attaches to a private network of contact center 102 (e.g., WiFi connection to a kiosk, etc.), within or controlled by contact center 102.

It should be appreciated that the description of contact center 102 provides at least one embodiment whereby the following embodiments may be more readily understood without limiting such embodiments. Contact center 102 may be further altered, added to, and/or subtracted from without departing from the scope of any embodiment described herein and without limiting the scope of the embodiments or claims, except as expressly provided.

Additionally, contact center 102 may incorporate and/or utilize social media website 130 and/or other external data sources 134 may be utilized to provide one means for a resource 112 to receive and/or retrieve contacts and connect to a customer of a contact center 102. Other external data sources 134 may include data sources, such as service bureaus, third-party data providers (e.g., credit agencies, public and/or private records, etc.). Customers may utilize their respective customer communication device 108 to send/receive communications utilizing social media server 130.

In accordance with at least some embodiments of the present disclosure, the communication network 104 may comprise any type of known communication medium or collection of communication media and may use any type of protocols to transport electronic messages between endpoints. The communication network 104 may include wired and/or wireless communication technologies. The Internet is an example of the communication network 104 that constitutes an Internet Protocol (IP) network consisting of many computers, computing networks, and other communication devices located all over the world, which are connected through many telephone systems and other means. Other examples of the communication network 104 include, without limitation, a standard Plain Old Telephone System (POTS), an Integrated Services Digital Network (ISDN), the Public Switched Telephone Network (PSTN), a Local Area Network (LAN), a Wide Area Network (WAN), a Session Initiation Protocol (SIP) network, a Voice over IP (VoIP) network, a cellular network, and any other type of packet-switched or circuit-switched network known in the art. In addition, it can be appreciated that the communication network 104 need not be limited to any one network type and instead may be comprised of a number of different networks and/or network types. As one example, embodiments of the present disclosure may be utilized to increase the efficiency of a grid-based contact center 102. Examples of a grid-based contact center 102 are more fully described in U.S. Patent Publication No. 2010/0296417 to Steiner, the entire contents of which are hereby incorporated herein by reference. Moreover, the communication network 104 may comprise a number of different communication media, such as coaxial cable, copper cable/wire, fiber-optic cable, antennas for transmitting/receiving wireless messages, and combinations thereof.

The communication devices 108 may correspond to customer communication devices. In accordance with at least some embodiments of the present disclosure, a customer may utilize their communication device 108 to initiate a work item. Illustrative work items include, but are not limited to, a contact directed toward and received at a contact center 102, a web page request directed toward and received at a server farm (e.g., collection of servers), a media request, an application request (e.g., a request for application resources location on a remote application server, such as a SIP application server), and the like. The work item may be in the form of a message or collection of messages transmitted over the communication network 104. For example, the work item may be transmitted as a telephone call, a packet or collection of packets (e.g., IP packets transmitted over an IP network), an email message, an Instant Message, an SMS message, a fax, and combinations thereof. In some embodiments, the communication may not necessarily be directed at the work assignment mechanism 116, but rather may be on some other server in the communication network 104 where it is harvested by the work assignment mechanism 116, which generates a work item for the harvested communication, such as social media server 130. An example of such a harvested communication includes a social media communication that is harvested by the work assignment mechanism 116 from a social media network or server 130. Exemplary architectures for harvesting social media communications and generating work items based thereon are described in U.S. patent application Ser. Nos. 12/784,369, 12/706,942, and 12/707,277, filed Mar. 20, 2010, Feb. 17, 2010, and Feb. 17, 2010, respectively; each of which is hereby incorporated herein by reference in its entirety.

The format of the work item may depend upon the capabilities of the communication device 108 and the format of the communication. In particular, work items are logical representations within a contact center 102 of work to be performed in connection with servicing a communication received at contact center 102 (and, more specifically, the work assignment mechanism 116). The communication may be received and maintained at the work assignment mechanism 116, a switch or server connected to the work assignment mechanism 116, or the like, until a resource 112 is assigned to the work item representing that communication. At which point, the work assignment mechanism 116 passes the work item to a routing engine 132 to connect the communication device 108, which initiated the communication, with the assigned resource 112.

Although the routing engine 132 is depicted as being separate from the work assignment mechanism 116, the routing engine 132 may be incorporated into the work assignment mechanism 116 or its functionality may be executed by the work assignment engine 120.

In accordance with at least some embodiments of the present disclosure, the communication devices 108 may comprise any type of known communication equipment or collection of communication equipment. Examples of a suitable communication device 108 include, but are not limited to, a personal computer, laptop, Personal Digital Assistant (PDA), cellular phone, smart phone, telephone, or combinations thereof. In general, each communication device 108 may be adapted to support video, audio, text, and/or data communications with other communication devices 108 as well as the processing resources 112. The type of medium used by the communication device 108 to communicate with other communication devices 108 or processing resources 112 may depend upon the communication applications available on the communication device 108.

In accordance with at least some embodiments of the present disclosure, the work item is sent toward a collection of processing resources 112 via the combined efforts of the work assignment mechanism 116 and routing engine 132. The resources 112 can either be completely automated resources (e.g., Interactive Voice Response (IVR) units, microprocessors, servers, or the like), human resources utilizing communication devices (e.g., human operators utilizing a computer, telephone, laptop, etc.), or any other resource known to be used in contact center 102.

As discussed above, the work assignment mechanism 116 and resources 112 may be owned and operated by a common entity in a contact center 102 format. In some embodiments, the work assignment mechanism 116 may be administered by multiple enterprises, each of which has its own dedicated resources 112 connected to the work assignment mechanism 116.

In some embodiments, the work assignment mechanism 116 comprises a work assignment engine 120, which enables the work assignment mechanism 116 to make intelligent routing decisions for work items. In some embodiments, the work assignment engine 120 is configured to administer and make work assignment decisions in a queueless contact center 102, as is described in U.S. patent application Ser. No. 12/882,950, the entire contents of which are hereby incorporated herein by reference. In other embodiments, the work assignment engine 120 may be configured to execute work assignment decisions in a traditional queue-based (or skill-based) contact center 102.

The work assignment engine 120 and its various components may reside in the work assignment mechanism 116 or in a number of different servers or processing devices. In some embodiments, cloud-based computing architectures can be employed whereby one or more components of the work assignment mechanism 116 are made available in a cloud or network such that they can be shared resources among a plurality of different users. Work assignment mechanism 116 may access customer database 118, such as to retrieve records, profiles, purchase history, previous work items, and/or other aspects of a customer known to contact center 102. Customer database 118 may be updated in response to a work item and/or input from resource 112 processing the work item.

It should be appreciated that one or more components of contact center 102 may be implemented in a cloud-based architecture in their entirety, or components thereof (e.g., hybrid), in addition to embodiments being entirely on-premises. In one embodiment, customer communication device 108 is connected to one of resources 112 via components entirely hosted by a cloud-based service provider, wherein processing and data storage elements may be dedicated to the operator of contact center 102 or shared or distributed amongst a plurality of service provider customers, one being contact center 102.

In one embodiment, a message is generated by customer communication device 108 and received, via communication network 104, at work assignment mechanism 116. The message received by a contact center 102, such as at the work assignment mechanism 116, is generally, and herein, referred to as a "contact." Routing engine 132 routes the contact to at least one of resources 112 for processing.

In another embodiment, resource 112, when embodied as a human operator providing inputs and receiving outputs to a node of a network that is in communication, or may be enabled to be in communication, with external node 108, when embodied as a customer communication device. Operator database 136 may obtain and maintain baseline attributes, such as health, performance, physiological, etc., aspects of a particular operator. Deviations in performance, which may be greater than a previously determined threshold, may be an indicator that the operator is showing signs of illness. For example, speech patterns for a particular operator may be observed and maintained as a baseline in operator database 136. When the operator begins to deviate, such as by pausing longer than they normally do, indicating confusion, lack of comprehension, etc., then a microprocessor may determine such behaviors are outside of the baseline behavior for that particular operator and/or such a behavior is an indicator of an impairment, such as the onset of illness. This may occur even though the operator is able to perform their duties or at least perform their duties within an acceptable performance.

Figure 2:
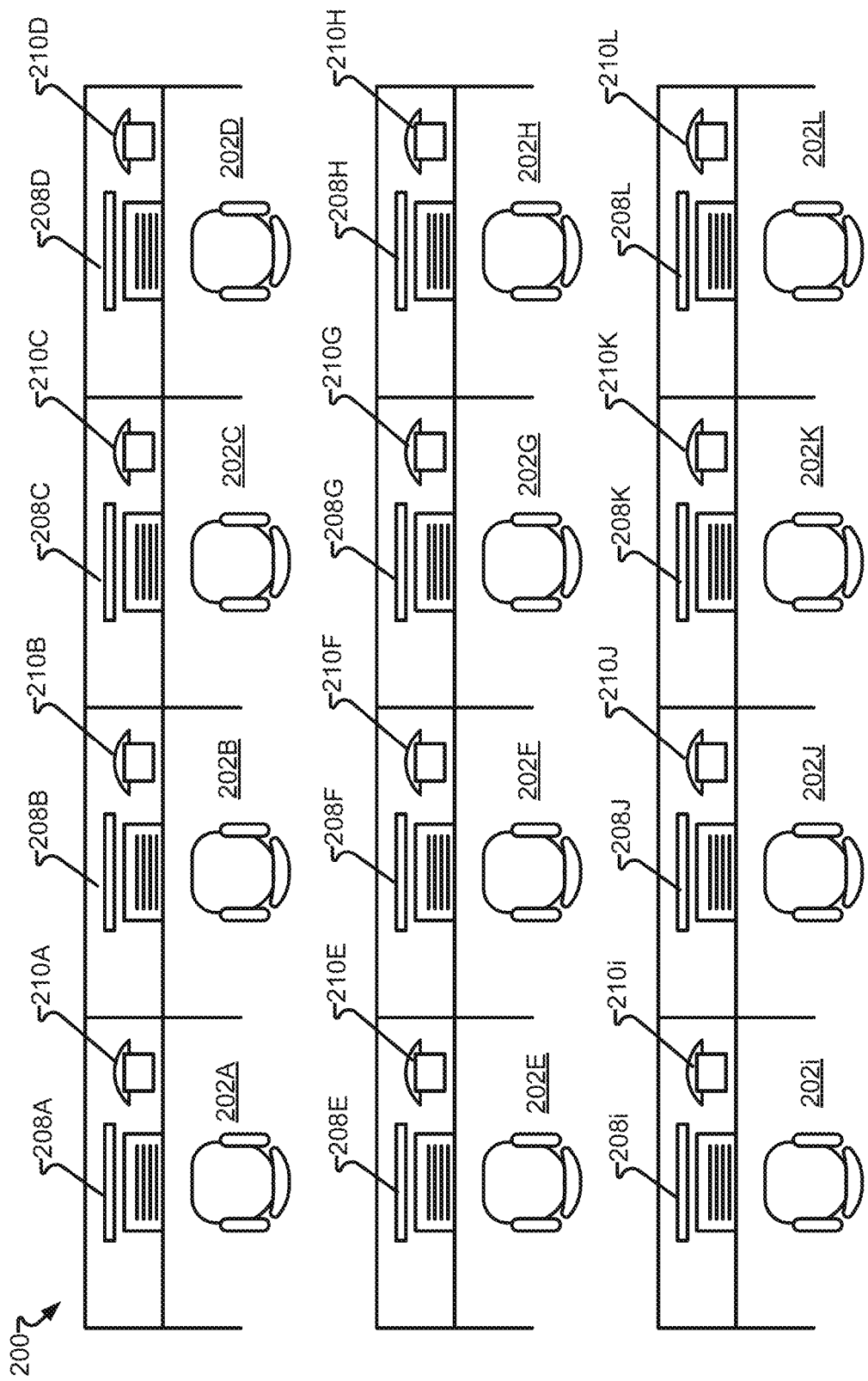
FIG. 2 depicts a work setting in accordance with embodiments of the present disclosure.

FIG. 2 depicts work setting 200 in accordance with embodiments of the present disclosure. In one embodiment, work setting 200 comprises a number of work areas 202, each having at least one node connected to a network, such as computer 208, which may be operable to serve as a communication node for voice (e.g., voice over internet (VoIP), session initiation protocol (SIP), plain old telephone service (POTS), etc.), video, text (e.g., messaging, email, etc.), and/or other communications modalities. Telephone 210 may be utilized for communications for digital (e.g., SIP, VoIP). Telephone 210 and computer 208 may be utilized independently or as a coordinated portions serving as a single node. Each node, 208 and/or 210, receives operator inputs and provides outputs to the operator when engaged in a communication with an external node, such as one comprising external node 108.

In another embodiment, each of nodes 208/210 is logically associated and may form a subnetwork. The plurality of nodes 208/210 may be logically "inside" contact center 102, wherein combinations to and from contact center 102 may utilize an one of nodes 208/210 for such communications. In another embodiment, at least one nodes 208/210 may be physically distinct, such as a different room, different building, different floor, etc., but remain logically within contact center 102. In contrast, external node 108 is logically distinct from contact center 102 and the plurality of nodes 208/210.

As will be described in detail with respect to the figures and embodiments that follow, operators are provided to operate their respective node 208 and/or node 210. Nodes 208/210 and/or other monitoring equipment may be utilized to observe an operator and determine whether the operator is indicating precursor behavior that is associated with node 208/210 becoming inoperable, such as due to the absence of the operator. An absence may be due to the onset of an illness. To avoid unnecessarily obfuscating the figures and description, each work area 202 is considered to have zero or one operator present. If two or more operators are present, such as during team or training activities, the performance observed from one operator may require additional observations to determine which of the operators is actually being observed. Alternatively, such behavior may be considered to be a behavior of each operator.

In another embodiment, if the behavior of an operator, such as an operator at work area 202A, is observed to indicate the onset of illness, a router may initiate a mitigating action to maintain sufficient nodes 208/210 to keep operational within acceptable parameters. For example, communications may be required to be performed within a certain time, as a lack of human attention may cause communications to become abandoned or due to a failure to complete a transaction or other operation (portions of a communication) before expiration of a deadline. For example, a communication to purchase a limited quantity item may be inoperable if the customer is enqueued and does not have the opportunity to establish a communication with a node and have an operator complete the transaction before the items are sold. In another example, a traveler may need to reschedule a flight and attempt to book a seat on the next flight leaving in a short time. If the traveler is unable to book the seat, such as due to a lack of operator-attended nodes 208/210, the communication will fail even if a seat was available.

In another embodiment, a mitigation activity may seek to isolate, in whole or in part, an operator at work area 202A, utilizing node 208/210, from physical contact with other operators. For example, a router may cause neighboring work areas to be idled to create a buffer, such as nodes 208B/210B, 208E/210E being configured to not be connected to the network and operators that would otherwise occupy such work areas (e.g., 202B, 202E) being vacant. In another embodiment, node 208A/210A may be established at a different location, such as the home of an operator, different portion of a building, floor, etc., such that contact from the operator, otherwise at work area 202A, is reduced or eliminated for operators remaining at other work areas, such as work areas 202B and 202E.

Figure 3:
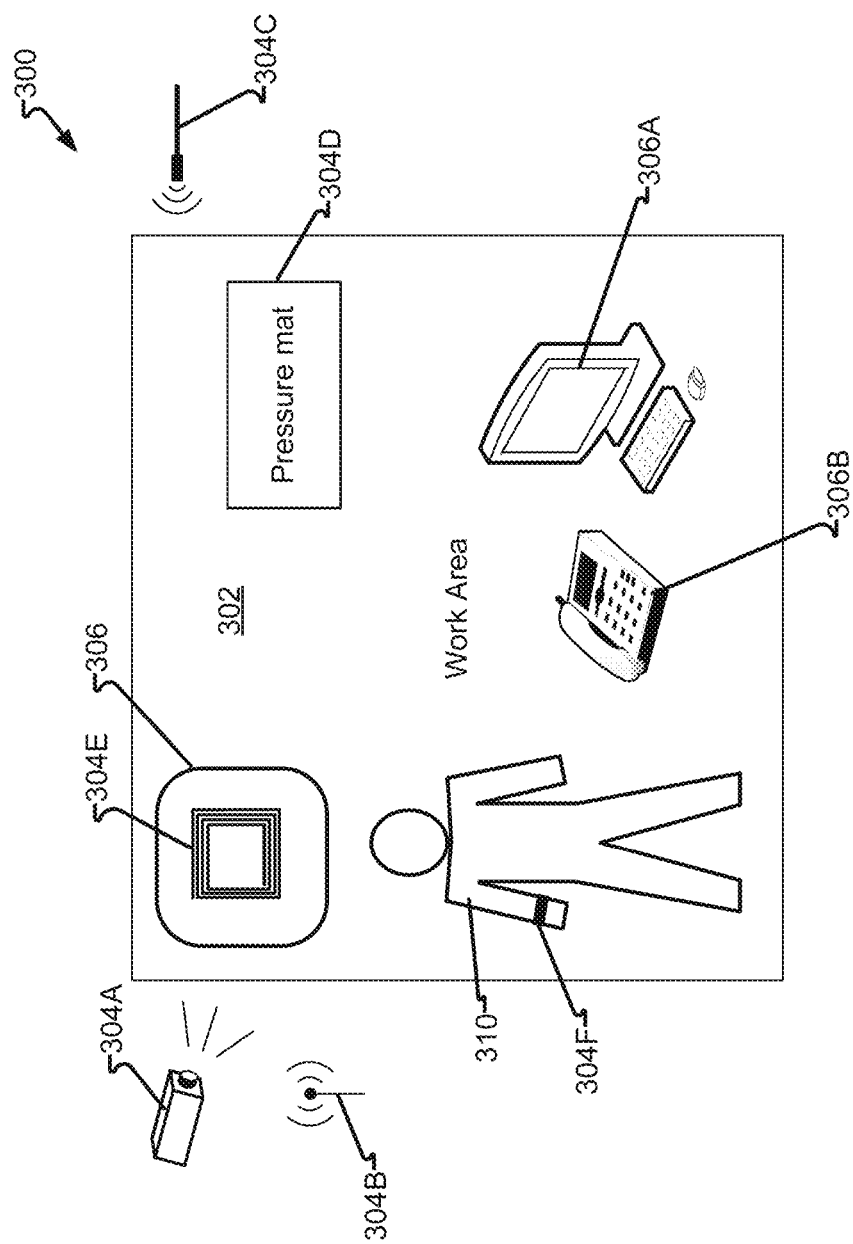
FIG. 3 depicts an area in accordance with embodiments of the present disclosure.

FIG. 3 depicts area 300 in accordance with embodiments of the present disclosure. In one embodiment, area 300 may be, or comprise, work area 302 which may an embodiment of one of work areas 202 (see FIG. 2) and/or other area which may include, but not be limited to, other work areas 202 where a particular operator may be in or transiting a public area, non-work area portion of contact center 102 (e.g., hallway, conference room, break room, etc.), operators home, and/or public area. One or more monitoring component 304 may observe a behavior or an attribute of operator 310 either directly (e.g., camera 304A configured to observe infrared images and observing an increase in body temperature of operator 310) and/or indirectly (e.g., antenna 304B observing object 306, having radio frequency identification tag 304E being, or not being, at a particular location at the usual time and the position of object 306 being determined by operator 310).

Monitoring component 304 is variously embodied, including any one or more of camera 304A (observing images in visible, infrared, ultraviolet, or other portion of the electromagnetic spectrum), antenna 304B, such as to receive signals from another component (e.g., wearable GPS or other position-indicating transmitter), microphone 304C, pressure mat 304D, RFID tag 304E on object 306, and/or wearable device 304F, which may provide data signals from observed attributes to antenna 304B. Additionally or alternatively, node 306A/306B, which may be one of nodes 208/210, may observe operator 310 in addition to serving as a node for a communication. Monitoring components 304A-F and/or nodes 306A/B, may provide signals via a network (not shown) or portion thereof, such as to a router or other component having a microprocessor and a network interface to receive such signals.

Figure 4:
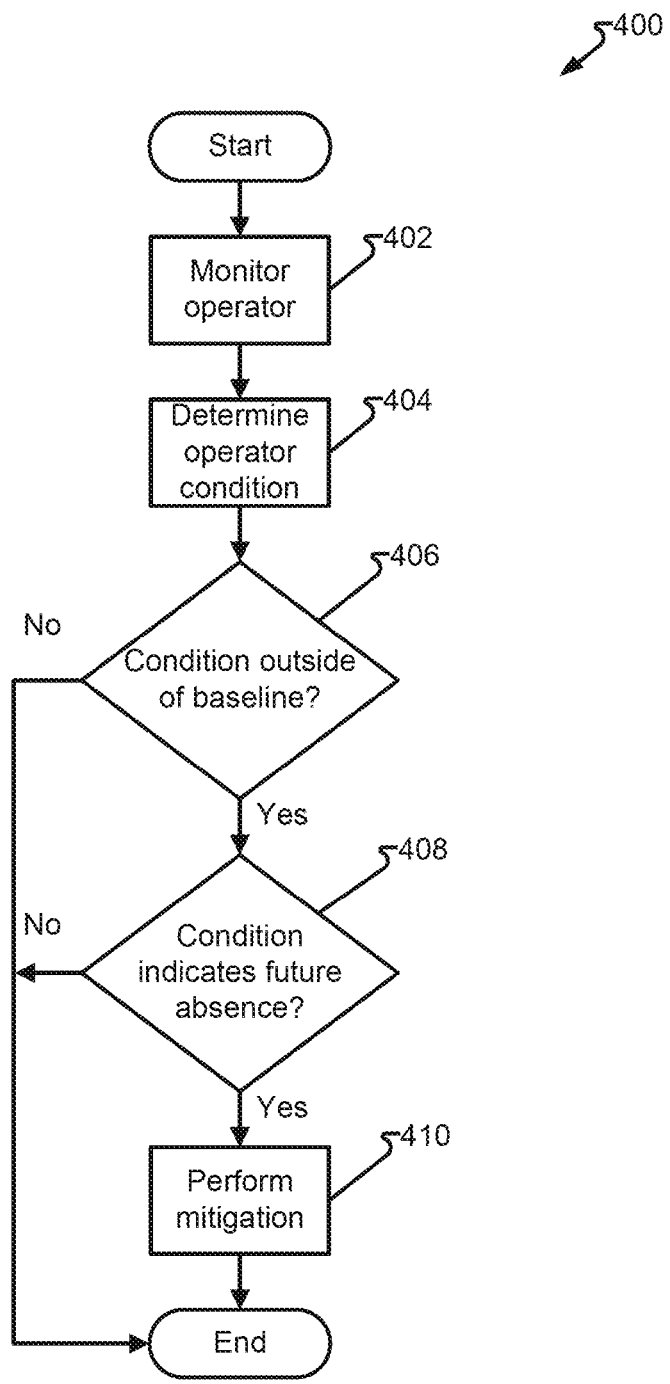
FIG. 4 depicts a process in accordance with embodiments of the present disclosure.

FIG. 4 depicts process 400 in accordance with embodiments of the present disclosure. In one embodiment, step 402 monitors an operator, such as one or more of monitoring component 304 monitoring operator 310. Step 404 determines if the signals comprise an operator condition. The condition may be associated with a forecasted absence, such as due to illness. Step 404 may exclude data signals that do not indicate an operator condition. Optional test 406 determines if the observed condition is outside a baseline, such as by accessing a record in operator database 136 for the observed subject. Test 408 determines if the observed condition indicates a future absence and, if yes, step 410 performs a mitigation action.

Test 406 and/or test 406 may access a database or other storage comprising records of associated observed signals, such as those obtained in step 402, with an operator condition. For example, one record may indicate that an elevated temperature is a precursor to being absent due to such an illness, such as one that has not yet produced overt symptoms. In another example, a particular speech pattern may be normal for one operator (e.g., in accordance with a baseline value maintained in operator database 136) whereas the same speech pattern may be unusual and indicate the operator is stressed or impaired, such as due to the onset of an illness.

Step 410 is variously embodied and may allocate additional nodes (e.g., nodes 208/210) in anticipation of a node being inoperable due to an absent operator. Additionally or alternatively, step 410 may temporarily reassign the affected node to a location designed to physically isolate an impaired operator to help prevent a contagion from affecting other operators and causing their respective nodes to become unattended. Step 410 may proactively take similar mitigating steps with operators that have had contact with an operator observed to be showing signs of illness, such as to mitigate the spreading of an illness.

Figure 5:
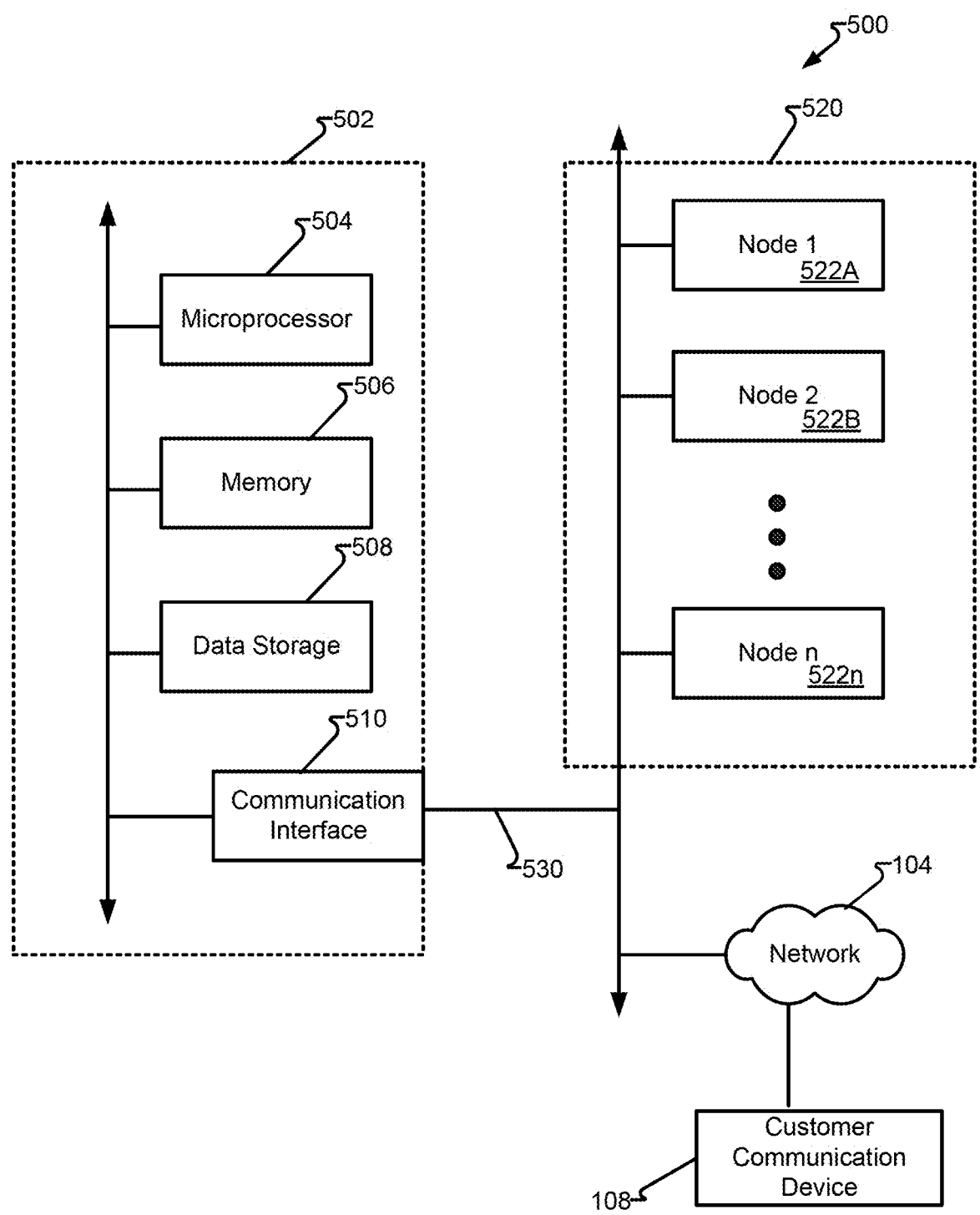
FIG. 5 depicts a second system in accordance with embodiments of the present disclosure.

FIG. 5 depicts second system 500 in accordance with embodiments of the present disclosure. In one embodiment, a communication comprises a node, such as an external node comprising customer communication device 108 and utilizing network 104. Router 502 may make decisions as to which node 522 receives a particular communication and becomes a node on such a communication. It should be appreciated that router 502 may, or may not, comprise functionality normally associated with a network router, but router 502 determines which node of nodes 522 to utilize for a communication with external node 108 and causes the communication to be established therebetween.

Router 502 comprises microprocessor 504, which may comprise its own memory, and/or utilize memory 506 and/or data storage 508 for the storage of data and/or instructions for execution by microprocessor 504. It should be appreciated that router 502 may utilize other storage devices, such as discrete storage appliances, server farm, "cloud" storage or other source of data and/or instructions without departing from the scope of the embodiments herein. Communication interface 510 may connect to network 104 via internal network 530 and/or other connectivity.

In another embodiment, one or more of nodes 208, 210, 306A, 306F may be embodied as one or more node 522 comprising a plurality of nodes 520. Each of nodes 522 comprise a human input-output interface and a communication interface, such as to network 104 and/or internal network 530. One or more nodes 522 may comprise a microprocessor, memory, and/or other components which may further be embodied as a monitoring component 304. Router 502 may determine which of nodes 522 will be utilized in a communication with external node 108 based, at least in part, on whether one or more nodes 522 are attended by an operator.

Router 502, such as by executing computer-readable instructions by microprocessor 504, may determine a mitigation action is required and execute said action. For example, if one node 522 is likely to become inoperable due to an absent operator, router 502 may allocate an additional node 522, reassign a node to another location (e.g., operator's home, different room, etc.), allocate another operator, which may utilize a reconfigured node 522 that is associated with the absent (or soon to be absent) operator, for example with the replacement operator's login credentials and/or other user-specific configuration.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose microprocessor (e.g., GPU, CPU), or logic circuits programmed with the instructions to perform the methods (e.g., FPGA). In another embodiment, a microprocessor may be a system or collection of processing hardware components, such as a microprocessor on a client device and a microprocessor on a server, a collection of devices with their respective microprocessor, or a shared or remote processing service (e.g., "cloud" based microprocessor). A system of microprocessors may comprise task-specific allocation of processing tasks and/or shared or distributed processing tasks. In yet another embodiment, a microprocessor may execute software to provide the services to emulate a different microprocessor or microprocessors. As a result, first microprocessor, comprised of a first set of hardware components, may virtually provide the services of a second microprocessor whereby the hardware associated with the first microprocessor may operate using an instruction set associated with the second microprocessor.

These machine-executable instructions may be stored on one or more machine-readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

While machine-executable instructions may be stored and executed locally to a particular machine (e.g., personal computer, mobile computing device, laptop, etc.), it should be appreciated that the storage of data and/or instructions and/or the execution of at least a portion of the instructions may be provided via connectivity to a remote data storage and/or processing device or collection of devices, commonly known as "the cloud," but may include a public, private, dedicated, shared and/or other service bureau, computing service, and/or "server farm."

Examples of the microprocessors as described herein may include, but are not limited to, at least one of Qualcomm® Snapdragon® 800 and 801, Qualcomm® Snapdragon® 610 and 615 with 4G LTE Integration and 64-bit computing, Apple® A7 microprocessor with 64-bit architecture, Apple® M7 motion comicroprocessors, Samsung® Exynos® series, the Intel® Core™ family of microprocessors, the Intel® Xeon® family of microprocessors, the Intel® Atom™ family of microprocessors, the Intel Itanium® family of microprocessors, Intel® Core® i5-4670K and i7-4770K 22 nm Haswell, Intel® Core® i5-3570K 22 nm Ivy Bridge, the AMD® FX™ family of microprocessors, AMD® FX-4300, FX-6300, and FX-8350 32 nm Vishera, AMD® Kaveri microprocessors, Texas Instruments® Jacinto C6000™ automotive infotainment microprocessors, Texas Instruments® OMAP™ automotive-grade mobile microprocessors, ARM® Cortex™-M microprocessors, ARM® Cortex-A and ARM926EJ-S™ microprocessors, other industry-equivalent microprocessors, and may perform computational functions using any known or future-developed standard, instruction set, libraries, and/or architecture.

Any of the steps, functions, and operations discussed herein can be performed continuously and automatically.

The exemplary systems and methods of this invention have been described in relation to communications systems and components and methods for monitoring, enhancing, and embellishing communications and messages. However, to avoid unnecessarily obscuring the present invention, the preceding description omits a number of known structures and devices. This omission is not to be construed as a limitation of the scope of the claimed invention. Specific details are set forth to provide an understanding of the present invention. It should, however, be appreciated that the present invention may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components or portions thereof (e.g., microprocessors, memory/storage, interfaces, etc.) of the system can be combined into one or more devices, such as a server, servers, computer, computing device, terminal, "cloud" or other distributed processing, or collocated on a particular node of a distributed network, such as an analog and/or digital telecommunications network, a packet-switched network, or a circuit-switched network. In another embodiment, the components may be physical or logically distributed across a plurality of components (e.g., a microprocessor may comprise a first microprocessor on one component and a second microprocessor on another component, each performing a portion of a shared task and/or an allocated task). It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the invention.

A number of variations and modifications of the invention can be used. It would be possible to provide for some features of the invention without providing others.

In yet another embodiment, the systems and methods of this invention can be implemented in conjunction with a special purpose computer, a programmed microprocessor or microcontroller and peripheral integrated circuit element(s), an ASIC or other integrated circuit, a digital signal microprocessor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this invention. Exemplary hardware that can be used for the present invention includes computers, handheld devices, telephones (e.g., cellular, Internet enabled, digital, analog, hybrids, and others), and other hardware known in the art. Some of these devices include microprocessors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this invention can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present invention describes components and functions implemented in the embodiments with reference to particular standards and protocols, the invention is not limited to such standards and protocols. Other similar standards and protocols not mentioned herein are in existence and are considered to be included in the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present invention.

The present invention, in various embodiments, configurations, and aspects, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments, configurations, or aspects for the purpose of streamlining the disclosure. The features of the embodiments, configurations, or aspects of the invention may be combined in alternate embodiments, configurations, or aspects other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the invention.

Moreover, though the description of the invention has included description of one or more embodiments, configurations, or aspects and certain variations and modifications, other variations, combinations, and modifications are within the scope of the invention, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

What is claimed is:

1. A system, comprising:
    a plurality of nodes, wherein each of the plurality of nodes comprises a network interface to a communication network and an input-output interface to translate operator inputs into signals for transmission to an external node via the communication network as a portion of a communication therebetween;
    a router, comprising a microprocessor and a network interface to the communications network, operable to route the communication with the external node to a selected one of the plurality of communication nodes to enable the communication therebetween; and
    an operator monitor providing an operator condition signal to the router, wherein the operator is associated with a monitored node of the plurality of nodes; and
    wherein the router, upon determining the operation condition signal is associated with a predicted operator absence, performs a mitigation comprising allocating, for use at a future time, an additional node and associated operator and adding the additional node to the plurality of nodes.

2. The system of claim 1, wherein the operator monitor comprises a portion of the monitored node.

3. The system of claim 1, wherein the operator monitor comprises a discrete device providing the operator condition signal to the router via the communication network.

4. The system of claim 3, wherein the discrete device comprises a wearable device worn by the operator.

5. The system of claim 1, wherein the operator monitor comprises the router.

6. The system of claim 1, wherein the additional node is physically segregated from the plurality of nodes.

7. The system of claim 1 wherein the router, upon determining the operation condition signal is associated with the predicted operator absence, idles the monitored node.

8. The system of claim 1, wherein the operator monitor providing the operator condition signal to the router, further comprises, the operator monitor monitoring data traffic on the network associated with the monitored node and determining, from the data traffic, an operator condition and deriving therefrom the operator condition signal.

9. The system of claim 1, wherein the additional node comprises the monitored node being reconfigured for a replacement operator.

10. The system of claim 1, wherein the mitigation further comprises allocating, for use at the future time, a supplemental additional node and associated supplemental operator and adding the supplemental additional node to the plurality of nodes.

11. A method, comprising:
    monitoring an operator of a monitored node, the monitored node being a node of a plurality of nodes, wherein each of the plurality of nodes comprises a network interface to a communication network and an input-output interface to translate operator inputs into signals for transmission to an external node via the communication network as a portion of a communication therebetween;
    determining, from the monitoring of the operator, an operator condition signal;

providing the operator condition signal to a router configured to connect a selected one of the plurality of nodes to engage in a communication with an external node not comprised by the plurality of nodes;
upon determining, by the router, that the operation condition signal is associated with a predicted operator absence and performing a mitigation comprising allocating, for use at a future time, an additional node and associated operator; and
adding the additional node to the plurality of nodes.

12. The method of claim 11, wherein the operator monitor comprises a portion of the monitored node.

13. The method of claim 11, wherein the operator monitor comprises a discrete device providing the operator condition signal to the router via the communication network.

14. The method of claim 13, wherein the discrete device comprises a wearable device worn by the operator.

15. The method of claim 11, wherein the operator monitor comprises the router.

16. The method of claim 11, wherein the additional node is physically segregated from the plurality of nodes.

17. The method of claim 11, further comprising, idling the monitored node, upon determining the operation condition signal is associated with the predicted operator absence.

18. The method of claim 11, wherein the additional node comprises the monitored node being reconfigured for a replacement operator.

19. The method of claim 11, wherein mitigating further comprises allocating, for use at the future time, a supplemental additional node and associated supplemental operator and adding the supplemental additional node to the plurality of nodes.

20. A non-transitory computer-readable medium comprising instructions that, when read by a microprocessor, cause the microprocessor to:
monitor an operator of a monitored node, the monitored node being a node of a plurality of nodes, wherein each of the plurality of nodes comprises a network interface to a communication network and an input-output interface to translate operator inputs into signals for transmission to an external node via the communication network as a portion of a communication therebetween;
determine, from the monitoring of the operator, an operator condition signal;
providing the operator condition signal to a router configured to connect a selected one of the plurality of nodes to engage in a communication with an external node not comprised by the plurality of nodes;
perform a mitigation comprising allocating, for use at a future time, an additional node and associated operator, upon determining, by the router, that the operation condition signal is associated with a predicted operator absence; and
add the additional node to the plurality of nodes.

* * * * *